United States Patent Office 2,802,020
Patented Aug. 6, 1957

2,802,020
PREPARATION OF ACETONITRILE

William L. Fierce, Crystal Lake, and Walter J. Sandner, Carpentersville, Ill., assignors to The Pure Oil Company, Chicago, Ill., a corporation of Ohio No Drawing. Application March 19, 1956, Serial No. 572,228

10 Claims. (Cl. 260—465.3)

This invention relates to a method for preparing acetonitrile and hydrogen cyanide and is more particularly concerned with a method in which these two compounds are prepared by reaction of methane with cyanogen.

We have discovered that if a mixture of methane and cyanogen is heated to a temperature sufficiently high, they react to give good yields of acetonitrile and hydrogen cyanide. Acetonitrile is valuable in the preparation of acetone and other ketones through the mechanism of the Grignard reaction, followed by hydrolysis. Acetonitrile can also be hydrolyzed to acetamide and acetic acid.

An object of the invention is to provide a method for preparing acetonitrile.

Another object of the invention is to provide a method for preparing hydrogen cyanide.

Still a further object of the invention is to provide a method for simultaneously preparing acetonitrile and hydrogen cyanide from methane or gases rich in methane.

In accordance with our invention a mixture of methane, or gas rich in methane, and cyanogen is reacted at a temperature of approximately 700° C. to 1200° C. Within this range of temperature, methane reacts rapidly with cyanogen to produce acetonitrile and hydrogen cyanide according to the reaction:

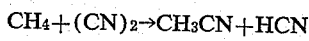

$$CH_4 + (CN)_2 \rightarrow CH_3CN + HCN$$

The reaction proceeds at atmospheric pressure, although it can be carried out at either sub-atmospheric or super-atmospheric pressures. In order to increase the yield per pass of acetonitrile, based on cyanogen charged, we prefer to use a molar excess of methane over that stoichiometrically required for the reaction. Although we prefer to use a mol ratio of methane to cyanogen of 2 to 10 of the former to 1 of the latter, the mol ratio may vary widely as, for example, from 1–20 mols of methane to 20–1 mols of cyanogen. The reaction gases may be passed through the reaction zone at a gaseous hourly space velocity of approximately 100 to 2000, but we prefer to operate at a space velocity of approximately 200 to 400. By space velocity is meant the ratio of the volume of gases at standard temperature and pressure charged per hour to the volume of the reaction space. In carrying out the process, the cyanogen and methane may either be premixed and preheated or may be charged independently to the reaction zone maintained at the desired reaction temperatures. Any type of reaction zone which is resistant to corrosion by the reaction materials may be used, such as quartz or high-silica glass of stainless steel. The reaction zone may be heated electrically, or by combustion gases applied externally or through heating tubes placed in the reactor; or the reaction zone may be filled with refractory pebbles which are intermittently heated to the desired reaction temperature.

Reaction effluent, which comprises hydrogen cyanide, acetonitrile, unconverted methane and/or cyanogen, as well as small amounts of other by-products, is cooled to a temperature sufficiently low to condense the acetonitrile, that is, below about 81° C. and preferably to a temperature below 70° C. to insure condensation of any acrylonitrile that may be present. The resulting liquid product can be separated by careful fractionation to obtain substantially pure acetonitrile and acrylonitrile. Hydrocyanic acid can be recovered from the reaction effluent gas by well-known fractionating techniques, and can be used as such or converted to useful cyanide compounds. We prefer, however, to convert the hydrogen cyanide back to cyanogen by a suitable method as, for example, oxidation in the presence of a silver catalyst or by reaction with nitrogen dioxide at elevated temperatures above about 200° C., as disclosed in our co-pending application Serial No. 553,428. The ultimate product of the reaction is acetonitrile and the hydrogen cyanide is substantially all consumed through conversion to recycle cyanogen. The combined process can be represented by the following equations:

$$CH_4 + (CN)_2 \rightarrow CH_3CN + HCN$$
$$2HCN + NO_2 \rightarrow (CN)_2 + H_2O + NO$$

It will be apparent that the theoretical amount of HCN produced is only one-half that required to make sufficient cyanogen for reaction with the methane so that additional cyanogen must be supplied from other sources, such as by the well-known reaction of potassium cyanide with copper sulfate or by the reaction of hydrogen cyanide with oxygen or nitrogen dioxide.

Any unreacted methane and/or cyanogen can be recycled to the reaction zone in admixture with fresh charge so as to convert them to further quantities of acetonitrile.

The reaction proceeds readily in the absence of catalysts, but it is expected that suitable catalysts would accelerate the rate of reaction. In order to demonstrate the invention, a mixture of cyanogen and a commercial grade of methane was passed through an empty, electrically heated Vycor tube having a length of 12", and outside diameter of 7/8" and a volumetric capacity of 92 cc. Vycor is a high-silica glass suitable for use at elevated temperatures. The methane and cyanogen were mixed prior to passing through the tube, which was heated to a temperature of 903° C. The conditions of reaction and the results obtained are set forth in the following table:

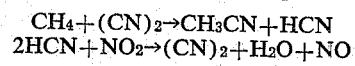

Table I

| | |
|---|---|
| Temperature (° C.) | 903 |
| Mol ratio of CH$_4$/(CN)$_2$ | 7.2 |
| Gaseous hourly space velocity of charge gas | 311 |
| Percent conversion of CH$_4$ | 6.5 |
| Percent conversion of (CN)$_2$ | 85.7 |
| Acetonitrile, yield per pass | 48.4 |
| Acetonitrile, selectivity | 56.5 |
| Acrylonitrile, yield per pass | [1] 9.5 |
| Acrylonitrile, selectivity | [1] 11.0 |
| Hydrocyanic acid, yield per pass | 81.3 |
| Hydrocyanic acid, selectivity | [2] 95.0 |

[1] From ethane present as impurity.
[2] Includes HCN from reaction of ethane.

Analysis of the reaction product was performed by means of a mass spectrometer.

The yield per pass given in the table is the mols of indicated product formed, expressed as a percentage of the total mols of cyanogen charged. The selectivity is the quantity of the cyanogen which goes to form the indicated product, expressed as a percentage of the total quantity of cyanogen consumed.

From an examination of the table it will be seen that the yield of acetonitrile per pass was 48.4 percent and the selectivity was 56.5 percent. It will also be seen that a substantial amount of acrylonitrile was produced. It is believed that the major part, if not all, of the acrylonitrile resulted from the reaction of cyanogen with ethane and higher molecular weight hydrocarbons in the charge, since it is known that acrylonitrile forms when cyanogen reacts with the higher molecular weight paraffinic hydrocarbons. The commercial methane used in the example above given had the following composition:

| | Percent |
|---|---|
| $CH_4$ | 93.8 |
| $C_2H_6$ | 4.4 |
| $C_3$ hydrocarbons | 1.2 |
| $C_4+$ hydrocarbons | $\leq 0.6$ |

Methane consumed in the reaction was converted almost entirely to acetonitrile. If pure methane is used as the charge, the reaction is specific to acetonitrile and less cyanogen is consumed in side reactions.

It will be seen, therefore, that our method is capable of producing high yields of acetonitrile by a simple synthesis involving the reaction of methane and cyanogen.

We claim:

1. The method of preparing acetonitrile comprising reacting methane and cyanogen at a sufficiently high temperature between 700–1200° C. to induce reaction between the methane and cyanogen.

2. Method in accordance with claim 1 in which the mol ratio of methane to cyanogen is 1 to 20 of the former to 20 to 1 of the latter.

3. Method in accordance with claim 2 in which the space velocity is about 100 to 2000.

4. The method of preparing acetonitrile and hydrogen cyanide comprising subjecting a mixture of methane and cyanogen to a temperature of about 850–950° C. in a reaction zone, cooling the reaction mixture to a temperature sufficiently low to condense acetonitrile and recovering the acetonitrile from the liquid product.

5. Method in accordance with claim 4 in which the temperature is about 900° C.

6. Method in accordance with claim 5 in which the mol ratio of methane to cyanogen charged to the reaction zone is about 7:1.

7. Method in accordance with claim 6 in which the space velocity is approximately 300.

8. Method in accordance with claim 4 in which hydrogen cyanide is separated from the reaction product, the separated hydrogen cyanide is converted to cyanogen by reaction with nitrogen dioxide at temperatures of about 200–500° C., and the cyanogen is recycled for reaction with further quantities of methane.

9. The method of preparing acetonitrile comprising reacting methane and cyanogen at a sufficiently high temperature between 700–1200° C. to produce acetonitrile and hydrogen cyanide, separating hydrogen cyanide from the reaction products, converting the separated hydrogen cyanide to cyanogen and recycling the last-mentioned cyanogen for reaction with further quantities of methane.

10. Method in accordance with claim 1 in which the mol ratio of methane to cyanogen is 2 to 10 of the former to 1 of the latter and the space velocity is approximately 200 to 400.

References Cited in the file of this patent

UNITED STATES PATENTS

| 2,642,454 | Mahan et al. | June 16, 1953 |
| 2,745,864 | Dixon | May 15, 1956 |

OTHER REFERENCES

Janz: Jour. Am. Chem. Soc. vol. 74, pp. 4529–31 (1952).